(12) United States Patent
Zhengang et al.

(10) Patent No.: US 8,761,276 B2
(45) Date of Patent: Jun. 24, 2014

(54) OFDM SYMBOL STRUCTURE FOR POWER LINE COMMUNICATION

(75) Inventors: Pan Zhengang, Hong Kong (CN);
Huang Yuanliang, Hong Kong (CN);
Xiaoshuo Chen, Hong Kong (CN);
Shaohua Zhao, Hong Kong (CN)

(73) Assignee: Hong Kong Applied Science and Technology Research Institute Company Limited, Shatin (HK)

( * ) Notice: Subject to any disclaimer, the term of this patent is extended or adjusted under 35 U.S.C. 154(b) by 662 days.

(21) Appl. No.: 12/980,353

(22) Filed: Dec. 29, 2010

(65) Prior Publication Data

US 2012/0170670 A1 Jul. 5, 2012

(51) Int. Cl.
*H04L 27/28* (2006.01)
*H04L 25/03* (2006.01)
*H04J 11/00* (2006.01)
*H04B 3/54* (2006.01)
*H04L 5/00* (2006.01)
*H04L 27/26* (2006.01)

(52) U.S. Cl.
CPC .......... *H04B 3/542* (2013.01); *H04L 25/03343* (2013.01); *H04J 11/003* (2013.01); *H04L 27/2646* (2013.01); *H04L 5/0062* (2013.01); *H04B 2203/5416* (2013.01); *H04L 27/2627* (2013.01); *H04L 27/2605* (2013.01); *H04B 2203/5408* (2013.01)
USPC ............................. 375/260; 375/285; 375/346

(58) Field of Classification Search
USPC .......................... 375/260, 222, 285, 346–349
See application file for complete search history.

(56) References Cited

U.S. PATENT DOCUMENTS

| 5,828,293 | A | 10/1998 | Rickard |
| 7,715,425 | B2 | 5/2010 | Yonge, III et al. |
| 2002/0186715 | A1* | 12/2002 | Mestdagh ...................... 370/480 |
| 2007/0165728 | A1* | 7/2007 | Parizhsky et al. ............. 375/260 |
| 2009/0303869 | A1* | 12/2009 | Umari et al. .................. 370/210 |
| 2012/0033722 | A1* | 2/2012 | Varadarajan et al. ......... 375/227 |

OTHER PUBLICATIONS

Gerd Bumiller, System Architecture for Power-Line Communication and Consequences for Modulation and Multiple Access.
Kyoungnam Seo, Improved Impulse Detection in Power Line Communication Systems, Power Line Communications and Its Applications, 2008. ISPLC 2008. IEEE International Symposium on, Apr. 2-4, 2008, pp. 374-379.

* cited by examiner

*Primary Examiner* — Sam K Ahn
*Assistant Examiner* — Janice Tieu
(74) *Attorney, Agent, or Firm* — Eagle IP Limited; Jacqueline C. Lui

(57) ABSTRACT

A method for packing data over a power line communication channel is disclosed herein. The method comprises packing data into symbol body, adding a first pad in front of the symbol body to form a full symbol and determining the time instance in which the peak absolute voltage point of the AC electric power occurs. And subsequently it is to send the full symbol through the power line in a manner synchronized with the time instance aforesaid. Based on the interference condition detection, the invention allows receiver side adaptation.

14 Claims, 11 Drawing Sheets

OFDM SYMBOL STRUCTURE FOR POWER LINE COMMUNICATION

FIELD OF INVENTION

This invention relates to an electronic communication device, and in particular an device that transmits and/or receives digital data over the power line network.

BACKGROUND OF INVENTION

Electric power line is a good medium for data communication as it is ubiquitous to buildings and households in modern cities. However, reliable digital communication must overcome various kinds of noises and interferences presented on the power lines. They are: (1) background noise caused by summation of various low power noise sources, (2) narrow-band interferences, (3) periodic impulse interference with fixed time interval between bursts and (4) aperiodic impulsive interferences. The periodic impulse interference (PII) can further be categorized as Type I interference which is synchronous to the AC power line frequency of either 50 or 60 Hz, and Type II interference that is asynchronous to the AC line frequency. Type I interference is typically caused by dimmers, and rectifier diodes . . . , etc, and is rarely observed in other communication systems. However, the amplitude of the Type I interference can be stronger than the signal and its burst duration can be fairly wide. Thus the useful time interval for data transmission is greatly reduced. Hence a good power line communication device must combat this Type I interference effectively.

SUMMARY OF INVENTION

In the light of the foregoing background, it is an object of the present invention to develop a scheme that can transmit data reliably even in the presence of the Type I periodic impulse interference.

Accordingly, the present invention, in one aspect, is a method to pack data into symbol body in a power line communication system. It then adds a first pad in front of the symbol body to form a full symbol. It further determines the time instance of occurrence of peak absolute voltage point of the Alternate Current (AC) electric power and send the full symbol in a manner synchronized with the time instance through the power line.

In an exemplary embodiment of the present invention, the first pad further comprises an initial pad and a pre-pad. A post-pad is also appended behind the symbol body of the full symbol.

In another exemplary embodiment, the symbol body is an orthogonal frequency division multiplexing (OFDM) symbol body. The pre-pad duplicates the second half of the OFDM symbol body and the post-pad duplicates the first half of the OFDM symbol body. And the initial pad covers the time instance and is a cyclic prefix (CP) of the OFDM symbol body.

According to another aspect of the present invention, it is a system for packing data for power line communication comprising means for packing data into symbol body and adding a first pad in front of the symbol body to form a full symbol, and means for sending the full symbol through the power line at a predetermined time instance.

In a further aspect of the present invention, a method of accessing the impulse interference over a power line is disclosed. The method comprises the steps of sending a null symbol over the power line, receiving the null symbol, partitioning the received null symbol into a plurality of quadrants except the CP part, measuring the signal power in each quadrants and determining the impulse interference profile based on the measured signal power on each quadrants.

There are many advantages to the present invention. Firstly, it places the symbol body in the vicinity of the zero-crossing point of the AC voltage signal, as this area is least interfered by the periodic impulsive interference. Secondly, it appends pre-pad and post-pad to the symbol body, whereby the pre-pad and post-pad are filled with portions of data from the symbol body so that the resistance to impulse noise is stronger when comparing with OFDM transmission system without symbol repetition. And it provides means to measure the noise condition of the power line, and uses such measurement to adjust its transmission and demodulation strategy. Hence it is more adaptive and flexible to varied impulsive noise conditions compared with transmission system only using zero-crossing window.

Another advantage of the present invention is that the complexity at transmitter side is negligible and the additional complexity at receiver side is negligible as well.

DETAILED DESCRIPTION OF THE PREFERRED EMBODIMENTS

As used herein and in the claims, "comprising" means including the following elements but not excluding others.

Figure 1A:
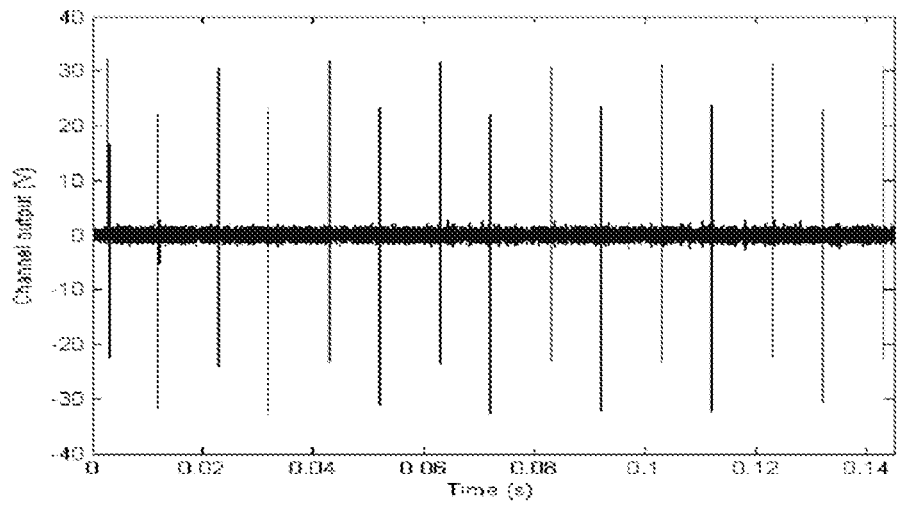
FIG. 1a shows the time domain waveform with impulse noise.
Figure 1B:
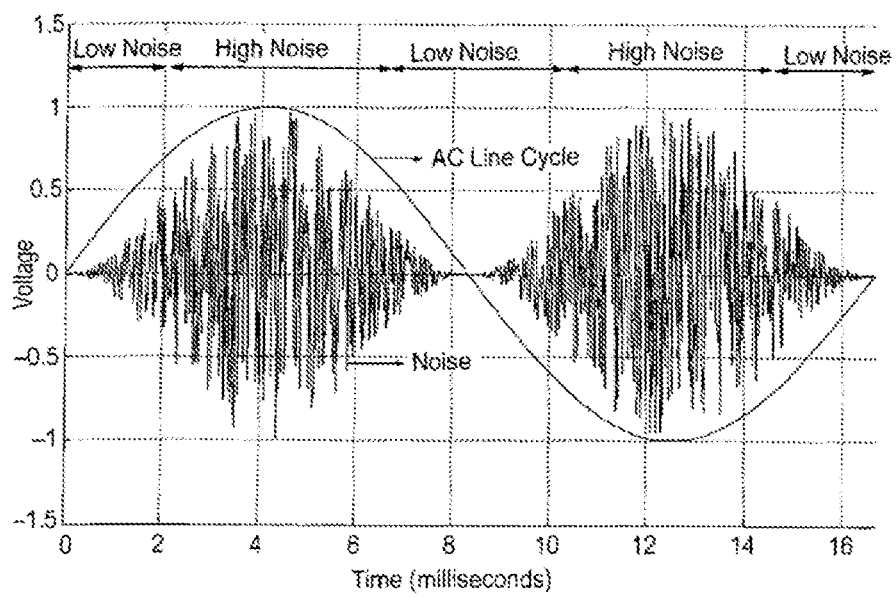
FIG. 1b is a diagram of noise variation with AC line cycle.

Referring now to FIG. 1a, it is the time domain waveform of one kind of periodic impulse noise. From the figure, it can be seen that impulse noise is periodic and its frequency doubles the frequency of the AC electric signal. The magnitude of the interference is very high but in between the interfering spikes, the noise power is small. FIG. 1b shows another variation of the periodic impulsive interference. Obviously, the amplitude, envelope and duration of the burst are quite different from the previous case. However, the interfering noise is minimum at the zero-crossing points of the AC voltage.

Figure 2:
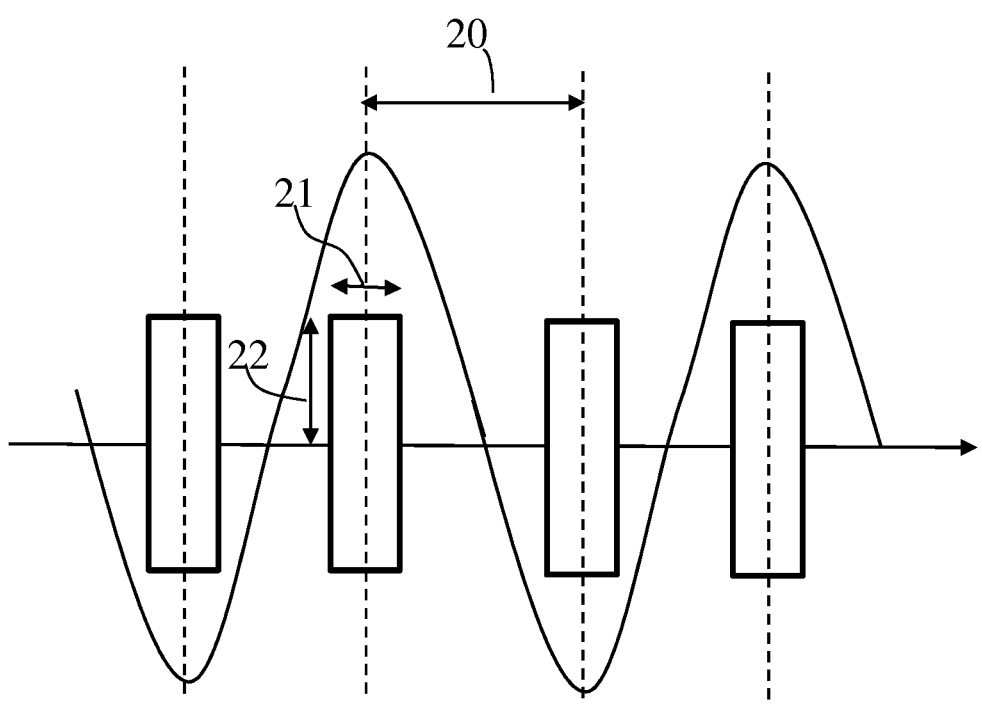
FIG. 2 is a modeling diagram of periodic impulse interference.

Referring now to FIG. 2, it is a modeling diagram of impulse interference. The period of burst/impulse 20 is 10 ms for 50 Hz of AC. The interfering impulse width 21 is variable and can be up to 6 ms, eating up the available time interval that can be used for data transmission. The magnitude of the impulse 22 is also variable and can be up to 20 dB of the useful signal. This imposes substantial challenge in designing a reliable system for power-line communication.

Figure 3:
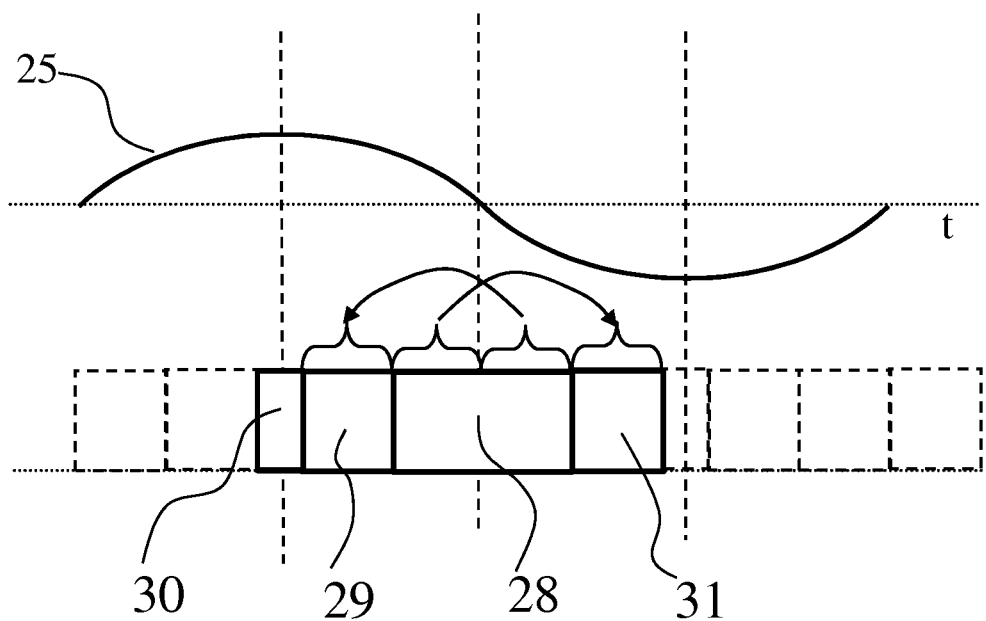
FIG. 3 shows a basic OFDM symbol structure in one embodiment of the present invention.

To combat the various kinds of noises and interferences on the power line, a novel data communication scheme is disclosed. In one embodiment of the present invention, the OFDM scheme with symbol structure as shown in FIG. 3 is adopted. The OFDM body 28 is symmetric with the zero-crossing points of the AC voltage 25, as the periodic impulse interference at these points is minimum. In one embodiment, the OFDM body 28 is also pre-padded and post-padded. In another embodiment, the width of the pre-padded and post-padded area is half of the width of the OFDM symbol. In yet another embodiment, the pre-pad data 29 is copied from the second half of the OFDM symbol 28 and the post-pad data 31 is copied from the first half of the OFDM symbol 28. A cyclic prefix (CP) 30, which is required for OFDM demodulation, is put in front of the pre-pad data 29 and it is symmetric to the peak absolute voltage of the AC voltage 25.

Figure 4:
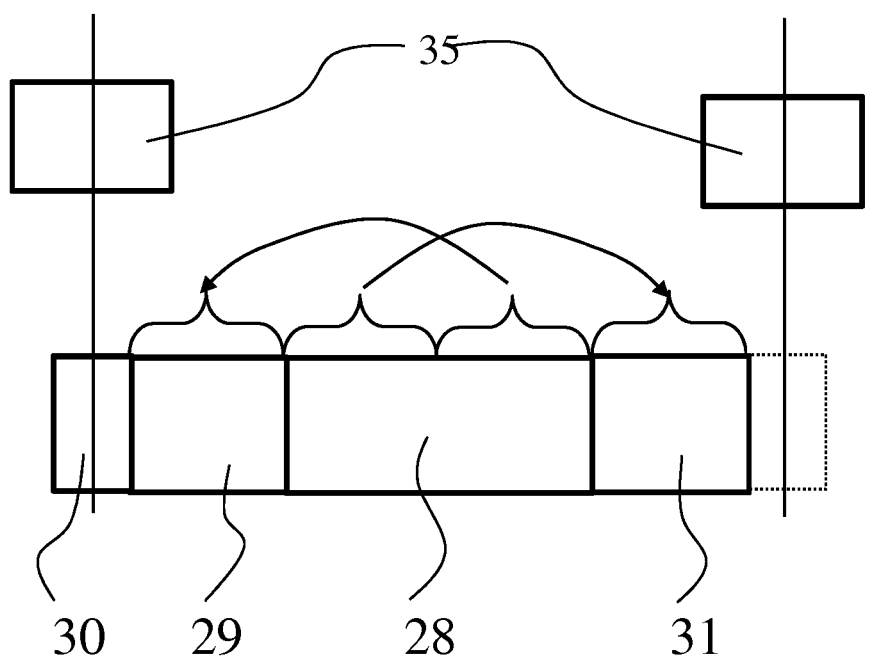
FIG. 4 shows the relationship between impulse interference and OFDM symbol in the same embodiment.

In FIG. 4, the relationship between periodic impulse interference and OFDM symbol is shown. Periodic impulse interferences 35 occur at the peak absolute magnitude of the AC voltage, which in this case correspond to two ends of OFDM symbol. The OFDM body 28 is thus located in most secured (i.e. least interference) time period and thus impulse interference can be avoided. The most noisy time interval is filled with cyclic prefix 30. In this way, the original "useless region" (i.e. the region having high periodic impulse interference 35) provides the guard interval for OFDM system and this will not affect the performance of OFDM system since the data in the cyclic prefix 30 is not needed for demodulation. This implementation also allows receiver side adaptation. When the periodic impulse interference 35 is wide, only the OFDM body 28 is used for demodulation. While for narrow impulse interference, it can be demodulated with OFDM body 28, pre-pad 29 and post-pad 31, resulting in a 3 dB of receiver gain.

Figure 5:
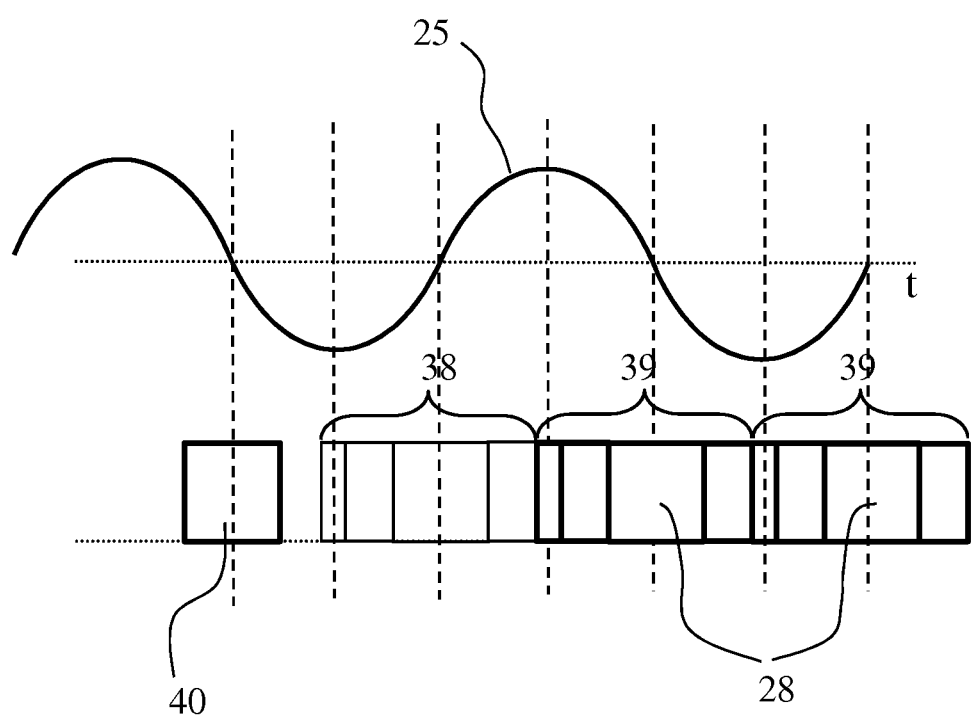
FIG. 5 is a frame architecture according to one embodiment of the present invention.

Now turning to FIG. 5, an embodiment of a frame architecture formed by the basic OFDM symbol structure is shown. In this embodiment, the frame architecture comprises a preamble 40 followed by a null symbol 38 and a number of OFDM symbols 39. The preamble 40 is symmetric with the zero-crossing point of the AC voltage 25 and it is used for packet detection, fine timing synchronization and Automatic Gain Control (AGC), etc. In one embodiment, the null symbol 38 has the same length of one full OFDM symbol 39.

Figure 6:
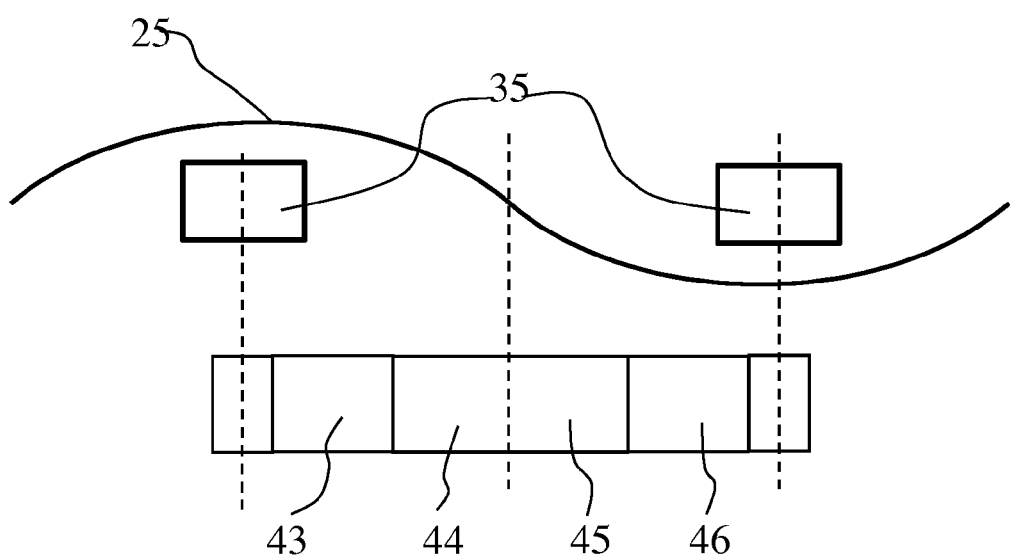
FIG. 6 shows the structure of null symbol in one embodiment.

In one embodiment of the current invention, the null symbol 38 is used for impulsive interference condition detection. FIG. 6 shows the structure of null symbol. The null symbol except the CP part is divided into four quadrants with same length, i.e. period A 43, period B 44, period C 45 and period D 46. At the receiver end, the signal and noise power in each quadrant is measured. The sum of powers of received signal during period A 43 and period D 46 will be compared with the sum of powers of received signal during period B 44 and period C 45. In one embodiment, if the former sum is larger than the latter sum multiplied by a pre-determined constant, the received signal will be demodulated with OFDM body 28 only. Otherwise, the received signal will be demodulated with OFDM body 28, pre-pad data 29 and post-pad data 31, leading to an additional 3 dB gain. In other words, let the powers during period A, period B, period C and period D be Pa, Pb, Pc and Pd respectively, and let the pre-determined constant be λ. If (Pa+Pd)>λ(Pb+Pc), the system demodulates the received signal with OFDM body 28 only, otherwise, it demodulates the received signal with OFDM body 28, pre-pad data 29 and post-pad data 31.

Figure 7:
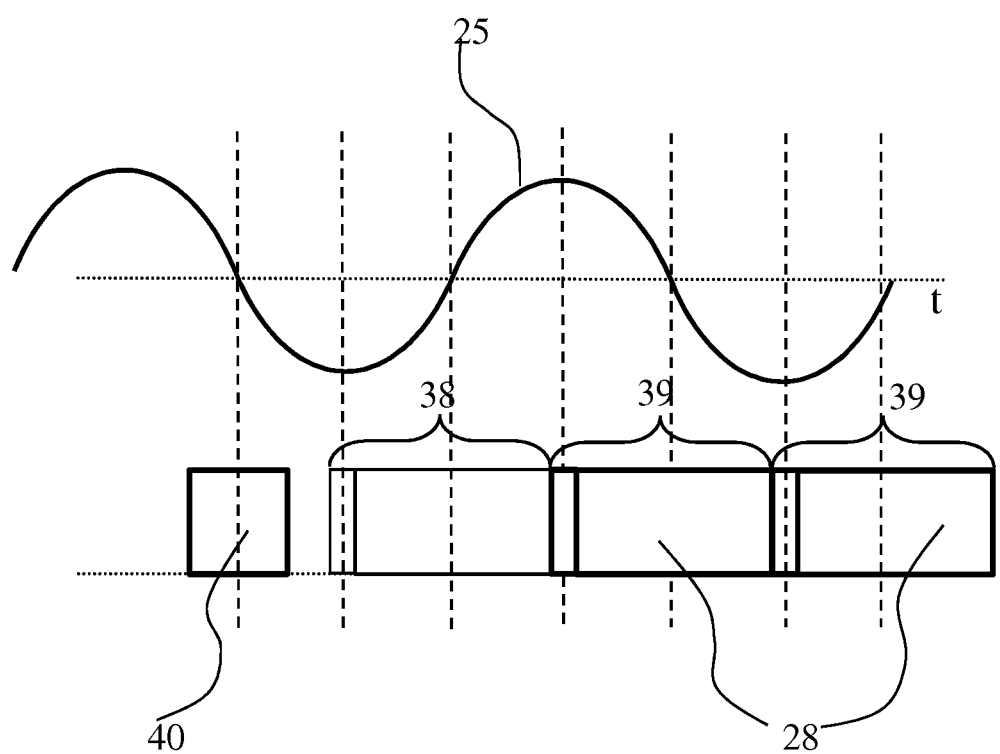
FIG. 7 shows the frame architecture in another manner.

In one embodiment, an enhanced feature is provided by the current invention. Referring to FIG. 7, in a close-loop system whereby the transmitter is capable of receiving channel interference information from the receiver, the transmitter can transmit a longer OFDM body 28 when the receiver detects that the width of the periodic impulse interference is narrow. In this case, the pre-pad data 29 and post-post data 31 are not needed and hence the system throughput is increased.

Numerical Results

In one implementation, the system parameters as shown in table 1 are used. In the table, all essential parameters are listed, such as the base band clock, the CP interval, and the modulation of each subcarrier, etc. Two cases are conducted—narrow impulsive interference and wide impulsive interference and their results are discussed below.

TABLE 1

| System parameters | |
| --- | --- |
| Base band clock (KHz): 250 | OFDM post-pad (ms): 2.048 |
| Subcarrier spacing (Hz): 244.14063 | OFDM post-pad (samples): 512 |
| Number of data subcarriers: 192 | OFDM body (ms): 4.096 |
| CP interval (ms): 1.808 | OFDM body (samples): 1024 |
| CP interval (samples): 452 | Preamble period (ms): 4.096 |
| OFDM pre-pad (ms): 2.048 | Preamble period (samples): 1024 |
| OFDM pre-pad (samples): 512 | Modulation of each subcarrier: D8PSK |
| FEC: ½ Convolutional Code | |

Figure 8:
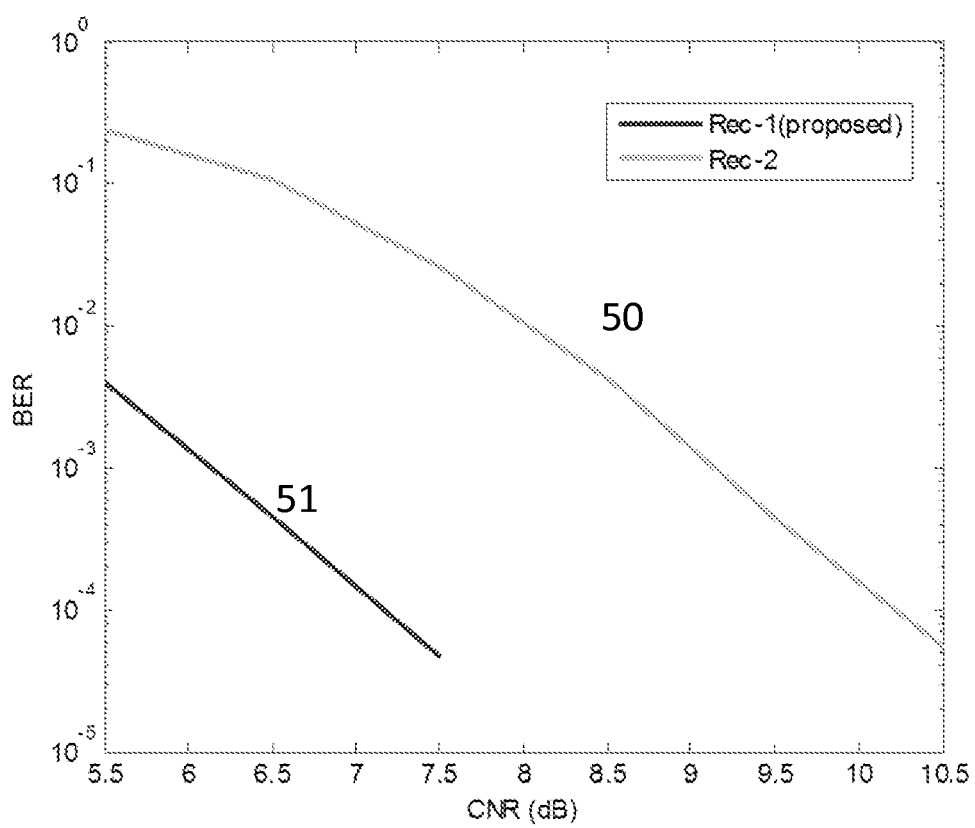
FIG. 8 shows the simulation result of demodulation with OFDM symbol body together with pads and demodulation with OFDM body only when the impulse width is smaller than the CP length.

In the case of narrow impulsive interference, i.e. the impulse width is smaller than the CP length, it is better to demodulate the signal with OFDM body 28, pre-pad data 29 and post-pad data 31 so as to maximize the communication channel utilization. FIG. 8 shows the simulation result of (1) demodulation with OFDM symbol body together with pads and (2) demodulation with OFDM body only. In this simulation, the impulsive interference is modeled as gated Gaussian white noise with duration 1 ms and variance $\sigma_I^2$. The ratio between impulsive interference power and background noise power is $$\mu = \frac{1}{10} \cdot \frac{\sigma_I^2}{\sigma_n^2} = 6.$$

At the receiver side, receiver 1 demodulates the signal with OFDM body plus pads based on impulse interference condition detection. For comparison, receiver 2 demodulates the signal with OFDM body only. In FIG. 8, the y axis is bit error rate (BER) while the x axis is carrier to noise ratio (CNR). The curve of receiver 1 50 and the curve of receiver 2 51 are shown in FIG. 8. From the simulation result, it can be seen that for the same bit error rate (BER), receiver 1 has higher carrier to noise ratio (CNR) than receiver 2. Hence receiver 1 which uses the proposed method of the current invention outperforms receiver 2.

Figure 9:
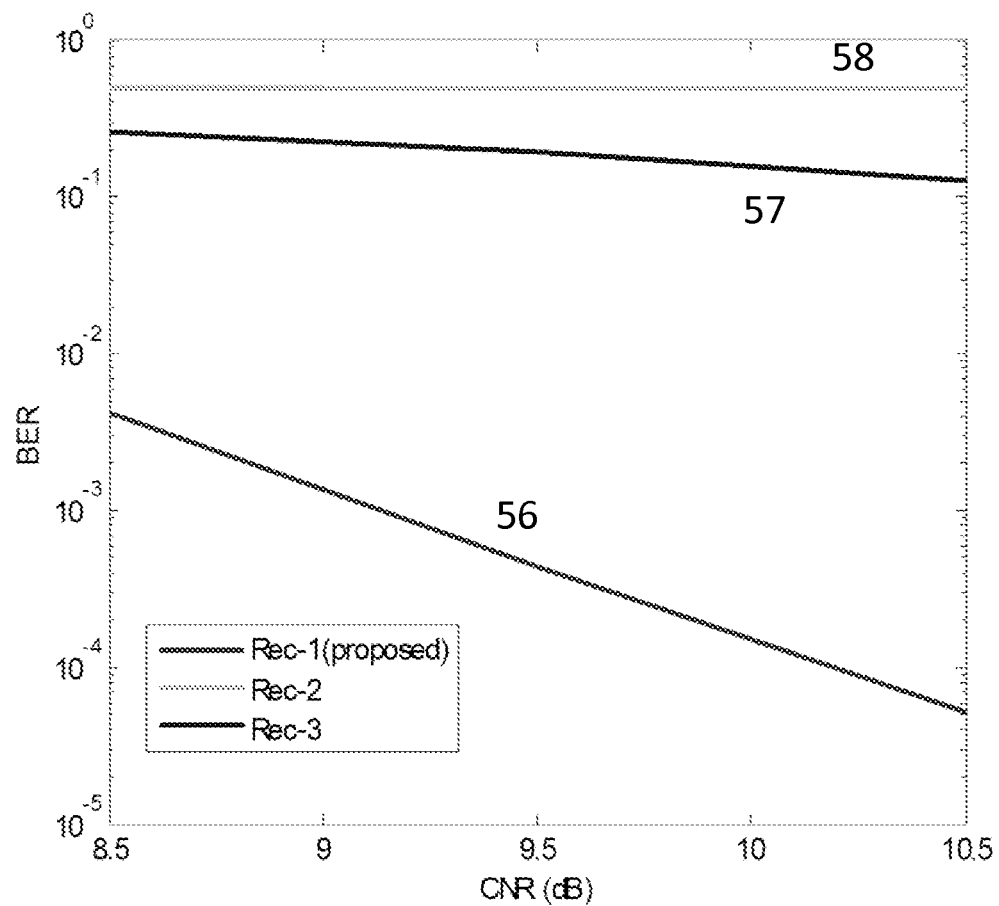
FIG. 9 shows the simulation result of demodulation with OFDM symbol body only, demodulation with pads only and demodulation with OFDM symbol body and pads when the impulse width is larger than the CP length.

In another case of wide impulsive interference, i.e. the impulse width is larger than the CP length, it is better to demodulate the signal with OFDM body only so as to reduce the bit error rate (BER). FIG. 9 shows the simulation result of (1) demodulation with OFDM symbol body only, (2) demodulation with pads only and (3) demodulation with OFDM symbol body and pads. In this simulation, impulsive interference is modeled as gated Gaussian white noise with duration 2 ms and variance $\sigma_I^2$. The ratio between impulsive interference power and background noise power is $$\mu = \frac{2}{10} \cdot \frac{\sigma_I^2}{\sigma_n^2} = 6.$$

At the receiver side, receiver 1 will demodulate the signal with OFDM body only based on impulse interference condition detection. For comparison, receiver 2 will demodulate the signal with pads only. Meanwhile, receiver 3 will demodulate the signal with OFDM body and pads. According to the curve for receiver 1 56, the curve for receiver 2 57 and the curve for receiver 3 58 in FIG. 9, it is obvious that for the same carrier to noise ratio (CNR), receiver 1 has the lowest bit error rate (BER) and thus the method of the current invention based on impulse interference condition detection is more reliable.

System Implementation

Figure 10:
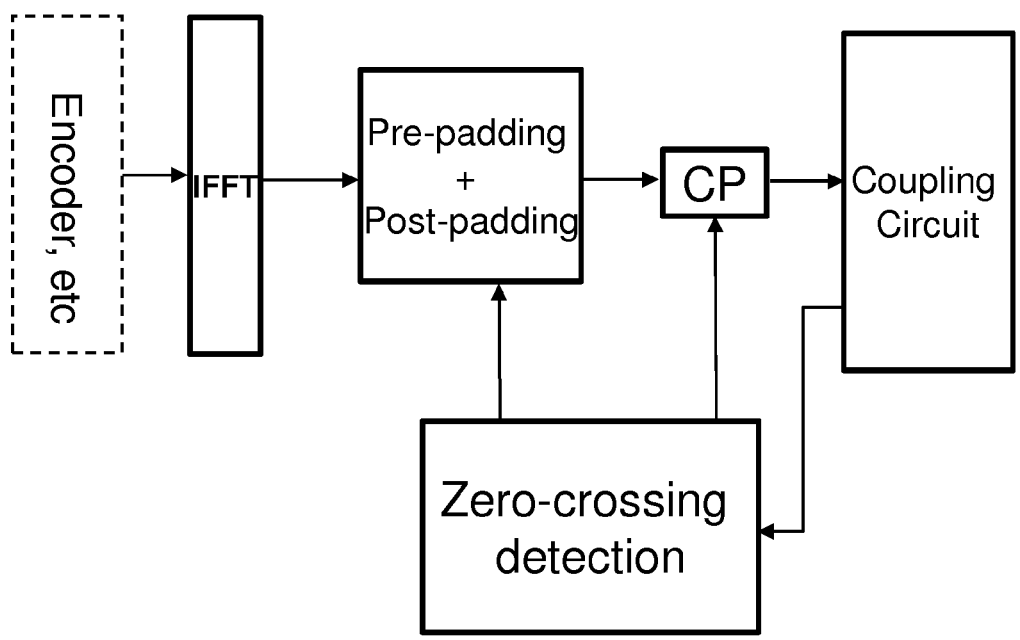
FIG. 10 is a block diagram of the transmitter in one embodiment of this invention.

An exemplary implementation of a transmitter module realizing the present invention is shown in FIG. 10. The directed line with arrow indicates the flow of signal /data. First, the signal is encoded by an encoder and then passed to the inverse fast Fourier transform (IFFT) module to generate the OFDM symbol body 28. Then pre-padding and post-padding are done in the pre-padding and post-padding module. Afterward, a cyclic prefix (CP) is inserted by the cyclic prefix module and the whole packet is input to a coupling circuit which also sends a copy of AC voltage for zero-crossing detection. Subsequently, the zero-crossing detection module deduces the peak voltage magnitude points and uses such information to properly locate the OFDM body, pads and CP. And finally the full symbol is transmitted through the power line in a manner synchronized with the time instance in which the peak absolute voltage point of the AC electric power occurs.

Figure 11:
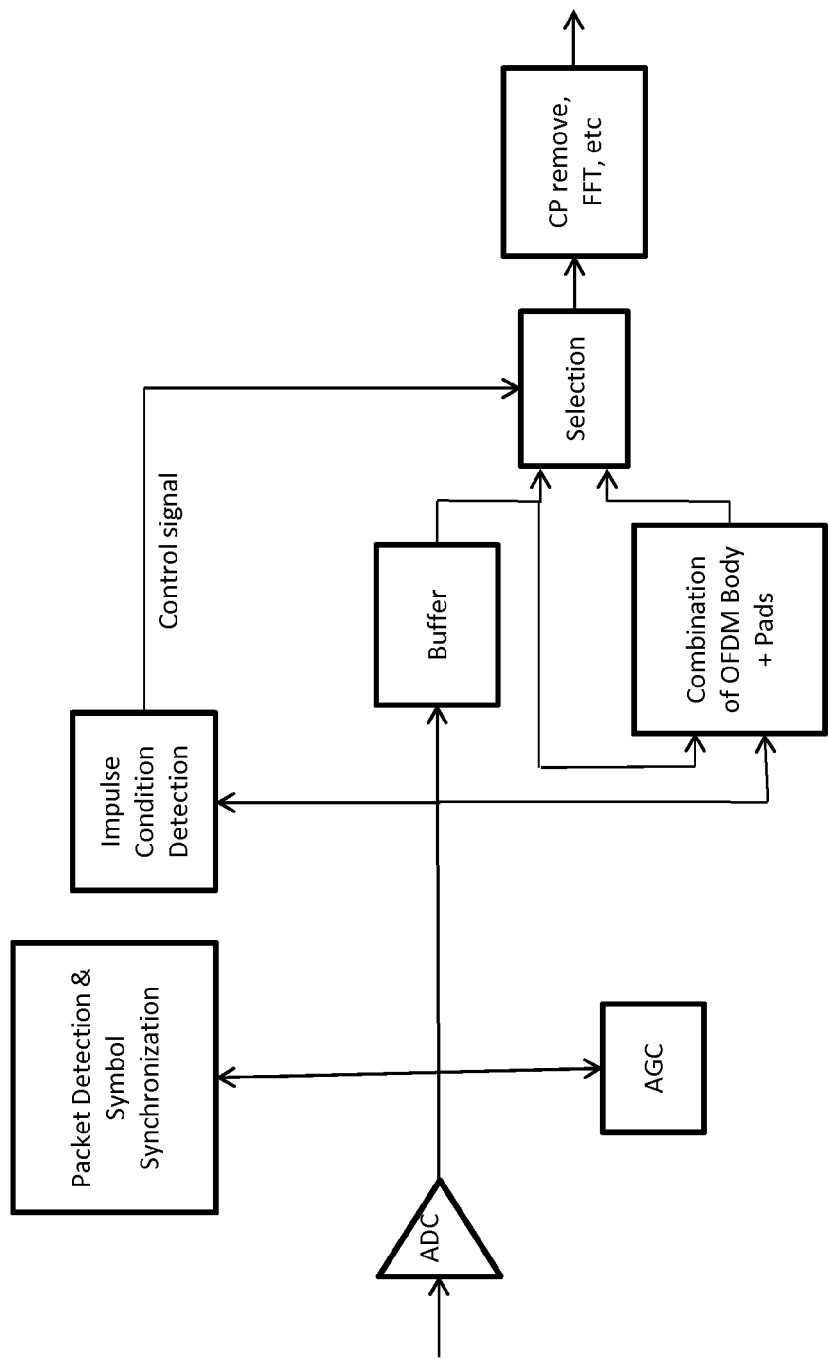
FIG. 11 is a block diagram of the receiver in one embodiment of this invention.

In another embodiment, the receiver module is designed to receive the transmitted packet and demodulate the proper content according to the impulsive interference condition detected. Now referring to FIG. 11, the block diagram of the receiver is shown. The received packet will first be gone through an analog to digital converter (ADC) module. And then the packet in digital form will undergo packet detection and symbol synchronization. An automatic gain control (AGC) module will monitor and adjust the gain to an appropriate level for a range of input signal levels. After that, the packet is fed into an impulse condition detection module in which impulse condition detection is done. In the meantime, the OFDM symbol body is fed into a first buffer while the pads are fed into a second buffer in which the OFDM symbol body bypassed from the output of the first buffer is combined with pads. In a selection module, the OFDM symbol body from the first buffer or the combination of OFDM symbol body and pads from the second buffer is selected to be demodulated based on the impulse condition detection. The last step is to remove the CP and do Fourier transformation (FFT) by a post-processing module.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, although OFDM scheme is used throughout this specification, it should not be construed as the only modulation/demodulation scheme required to realize the invention idea disclosed herein. In fact, other data packing method and modulation/demodulation scheme can also be used.

Secondly, the equation used, i.e. (Pa+Pd)>λ(Pb+Pc), needs not be the only way to determine impulsive interference condition. Based on the teaching of this disclosure, those skilled in the art can develop other formulas for detection but such variations should still be covered by this specification. An example of such variation is that when Pa is higher than a threshold, the pre-pad is not used for demodulation. Likewise when Pd is higher than a threshold, then the post-pad is not used.

In addition, the null symbol except the CP part needs not to be partitioned into 4 quadrants. Other numbers of partitions are also feasible for impulsive interference detection.

What is claimed is:

1. A method for packing data for power line communication comprising:
   a) packing said data into symbol body;
   b) adding a first pad in front of said symbol body to form a full symbol;
   c) determining the time instance in which the peak absolute voltage point of the alternating current (AC) electric voltage occurs along a power line through which said data is to be transmitted; and
   d) sending said full symbol through said power line in a manner synchronized with said time instance wherein said first pad covers said time instance;
   wherein said first pad further comprises an initial pad and a pre-pad;
   wherein said adding step further comprises appending a post-pad behind said symbol body in said full symbol; and
   wherein said symbol body is an orthogonal frequency division multiplexing (OFDM) symbol body; said pre-pad duplicating the second half of said OFDM symbol body; said post-pad duplicating the first half of said OFDM symbol body, and said initial pad covers said time instance and is a cyclic prefix (CP) of said OFDM symbol body.

2. The method according to claim 1 further comprising the step of receiving said full symbol through said power line; said receiving step demodulating said data from said OFDM symbol body.

3. The method according to claim 2 wherein said receiving step further utilizes said pre-pad and said post-pad to demodulate said data when a pre-defined condition is satisfied.

4. The method according to claim 3 further comprises the step of sending a preamble and a null symbol before packing and sending any data for timing synchronization and interference measurement.

5. The method according to claim 4 wherein said preamble is symmetric with the zero-crossing point of said AC electric voltage.

6. The method according to claim 4 wherein said null symbol is the same length of said full symbol.

7. The method according to claim 6 wherein said null symbol except said CP part is partitioned into four quadrants—the first, second, third and fourth quadrants; said pre-defined condition is satisfied when the sum of power of said first and fourth quadrant is not larger than the sum of power of said second and third quadrants by a pre-determined constant.

8. A system for packing data for power line communication comprising a transmitter module, which further comprises:
   a) an inverse fast Fourier transform module for packing said data into an orthogonal frequency division multiplexing (OFDM) symbol body;
   b) a pre-padding and post-padding module for adding a pre-pad in front of said OFDM symbol body and a post-pad behind said OFDM symbol body thereby forming an intermediate symbol wherein said pre-pad duplicates the second half of said OFDM symbol body and said post-pad duplicates the first half of said OFDM symbol body; and
   c) a cyclic prefix module for adding a cyclic prefix (CP) of said OFDM symbol body in front of said pre-pad of said intermediate symbol and thereby forming a full symbol; wherein said transmitter module is configured to send said full symbol through a power line at a predetermined time instance, said time instance being the peak absolute voltage point of the alternating current (AC) electric voltage that occurs along said power line through which said data is to be transmitted, and said cyclic prefix covers the time when said maximum voltage occurs.

9. The system according to claim 8, wherein said transmitter module is further configured to send a preamble and a null symbol before packing and sending any data wherein said preamble is symmetric with the zero-crossing point of said AC voltage and said null symbol is the same length of said full symbol.

10. The system according to claim 9, wherein said transmitter module further comprises:
   (a) a coupling circuit that couples to said cyclic prefix module and to said power line; and
   (b) a zero-crossing detection module to detect the time instance when said AC voltage changes polarity and to send out timing signals to said pre-padding and post-padding module and said cyclic prefix module.

11. The system according to claim 9 further comprises a receiver module that is adapted to receive said full symbol from said power line; said receiver module further comprising:
   a) an analog-to-digital converter (ADC) module;
   b) a first buffer that receives said OFDM symbol body from said ADC module;
   c) a second buffer that receives said pre-pad, said OFDM symbol body and said post-pad from said ADC module;
   d) an impulse condition detection module that couples to said ADC module to monitor the impulse interference on said power line; said impulse condition detection module measuring the level of said impulse interference and sending out a control signal;
   e) a selection module that couples to said first buffer and said second buffer and selects one of said buffers as output according to said control signal; and
   f) a post-processing module that receives said output from said selection module; said post-processing module further removing said cyclic prefix from said full symbol, and performing OFDM demodulation to recover said data.

12. The system according to claim 11 wherein said impulse condition detection module divides said null symbol except said CP part into four quadrants and measures the power in each quadrant; said impulse condition detection module sending out a first control signal when the sum of powers from the first and fourth quadrants is higher than the sum of powers from the second and third quadrants by a pre-determined constant; and sending out a second control signal otherwise.

13. The system according to claim 12 wherein said selection module selects said first buffer when it receives said first control signal and selects said second buffer when it receives said second control signal.

14. The system according to claim 11 wherein said receiver module further comprises
   a) a packet detect and symbol synchronization module coupled to said ADC module; and
   b) an automatic gain control (AGC) module coupled to said ADC module.

* * * * *